(12) United States Patent
Durant et al.

(10) Patent No.: US 12,217,251 B2
(45) Date of Patent: Feb. 4, 2025

(54) SYSTEM AND METHOD FOR THE PROTECTION OF CONSUMER FINANCIAL DATA UTILIZING DYNAMIC CONTENT SHREDDING

(71) Applicant: Cyber Reliant Corporation, Annapolis, MD (US)

(72) Inventors: Nathan Durant, Annapolis, MD (US); John Michael Suit, Mount Airy, MD (US); Ermis Sfakiyanudis, Annapolis, MD (US)

(73) Assignee: Cyber Reliant Corporation, Annapolis, MD (US)

( * ) Notice: Subject to any disclaimer, the term of this patent is extended or adjusted under 35 U.S.C. 154(b) by 518 days.

(21) Appl. No.: 16/749,183

(22) Filed: Jan. 22, 2020

(65) Prior Publication Data
US 2020/0160333 A1    May 21, 2020

Related U.S. Application Data

(63) Continuation of application No. 14/994,401, filed on Jan. 13, 2016, now abandoned.

(60) Provisional application No. 62/102,772, filed on Jan. 13, 2015.

(51) Int. Cl.
*G06Q 20/38* (2012.01)
*G06Q 20/40* (2012.01)

(52) U.S. Cl.
CPC ....... *G06Q 20/3829* (2013.01); *G06Q 20/401* (2013.01)

(58) Field of Classification Search
CPC .................. G06Q 20/3829; G06Q 20/401
See application file for complete search history.

(56) References Cited

U.S. PATENT DOCUMENTS

| | | | |
|---|---|---|---|
| 9,852,418 B2 * | 12/2017 | Mardikar | G07C 9/257 |
| 2005/0147250 A1 * | 7/2005 | Tang | G06Q 20/20 380/259 |
| 2010/0049658 A1 * | 2/2010 | Sanchez | G06Q 20/20 705/64 |
| 2010/0153703 A1 * | 6/2010 | Dodgson | G06F 21/805 380/278 |
| 2012/0084544 A1 * | 4/2012 | Farina | G06F 21/575 713/2 |

(Continued)

*Primary Examiner* — John W Hayes
*Assistant Examiner* — Yingying Zhou
(74) *Attorney, Agent, or Firm* — Whiteford, Taylor & Preston, LLP; Gregory M. Stone

(57) ABSTRACT

Consumer Point-of-Sale (POS) systems are becoming a major target for financial data loss within the commerce ecosystem. Privileged information, such as account numbers, card information, and transaction data are the primary targets during these data breaches. This information, while resident on a point-of-sale system, can be in plain text and susceptible to theft. The intent of this document is to present a unique solution that reduces the attack surface for these types of "hacks", and protects consumer data through specialized cryptographic operations including data level encryption with a cryptographic bitsplitting algorithm. This makes the data useless to those who would take the data unlawfully. The invention allows for the efficient and effective processing of financial data while converting the data to a useless state for those who would obtain it unlawfully.

12 Claims, 6 Drawing Sheets

(56) References Cited

U.S. PATENT DOCUMENTS

2012/0323717 A1* 12/2012 Kirsch .................... H04L 63/08
                                                            705/26.1
2014/0365776 A1* 12/2014 Smets .................. G06Q 20/401
                                                            713/171
2016/0371500 A1* 12/2016 Huang ................ G06F 21/6218

* cited by examiner

SYSTEM AND METHOD FOR THE PROTECTION OF CONSUMER FINANCIAL DATA UTILIZING DYNAMIC CONTENT SHREDDING

CROSS REFERENCE TO RELATED APPLICATION

This application is a continuation of U.S. patent application Ser. No. 14/994,401 entitled "SYSTEM AND METHOD FOR THE PROTECTION OF CONSUMER FINANCIAL DATA UTILIZING DYNAMIC CONTENT SHREDDING" filed with the U.S. Patent and Trademark Office on Jan. 13, 2016, which is based upon U.S. Provisional Patent Application Ser. No. 62/102,772 entitled "System and Method for the Protection of Consumer Financial Data Utilizing Dynamic Content Shredding," filed with the U.S. Patent and Trademark Office on Jan. 13, 2013, the specifications of which are incorporated herein by reference.

FIELD OF THE INVENTION

This invention relates generally to data level security, and more particularly to systems and methods for providing data level security in financial transactions, both in persistent and non-persistent memory, for usage within the commerce ecosystem including point-of-sale ("POS") systems.

BACKGROUND OF THE INVENTION

Financial data is a prime target for malicious users, and is often sought after by "hackers" due to the obvious fiscal benefits that might come through misappropriating such data. It has been demonstrated that this data can be obtained from POS systems or centralization servers. There are different methods that are being used by hackers to obtain such financial data, including techniques called memory scraping. Memory scraping is a method in which a malicious program searches an application's or a full system's non-persistent memory (RAM). The reasoning behind these attacks deals with the traditional lack of protection of financial information while it resides on the POS and other vendor systems before being sent for processing with the financial institutions.

Given the vulnerability of financial data when it is present in the POS and other vendor systems, and the harm that misappropriation of such data can cause to consumers and to the merchants with whom consumers wish to do business, there remains a need in the art for systems and methods capable of protecting such information from misappropriation, and preferably that would render such information wholly unusable by a would-be thief even if successful in obtaining unauthorized access to such data.

SUMMARY OF THE INVENTION

Disclosed herein are systems and methods configured to address and mitigate the data security risks commonly experienced by prior POS systems and vendor and other computing systems associated with such POS systems. The systems and methods disclosed herein are configured to address the overwhelming lack of efficient and effective methods for ensuring that data can be protected from those that wish to exploit it for financial gain.

The systems and methods set forth herein particularly provide for data conversion so that the data can be processed by modified processing systems, but is useless to a would-be exploiter of the data. If a breach occurs and a user or group of users is able to exfiltrate data from a financial processing system, it would be advantageous if that data had no value whatsoever to that user or group of users.

The system and methods described herein provide protection to data sets that can be applied at different locations depending on configuration and vendor needs. Preferably, this protection may in certain embodiments be applied at the time of a credit/debit card swipe as the information is being put into the non-persistent memory of the POS system. The data set remains in this protected state throughout its lifespan on the vendor systems, and may remain in this state until received at the intended endpoint (e.g., a financial institution), and likewise may be removed entirely from the vendor systems before being sent over a secure channel to the necessary financial institutions.

In accordance with an embodiment of the invention, the described "protected state" is a conjunction of two cryptographic operations, namely, data level encryption and a cryptographic bitsplitting operation that utilizes a keyed information dispersal algorithm (IDA) to break up data into multiple splits. The data level encryption in this system uses block ciphers to perform the necessary encryption, with a rotating dynamic key exchange. This key exchange insures that only the necessary components within the system have access to the encrypted data, with all other components only able to view necessary meta-data.

There are multiple options for where this key exchange occurs, depending on the requirements of any given implementation. If simple vendor protection is necessary, key exchange can be conducted between the endpoint device (scanner/POS) and the vendor centralized server, where the protection will be removed before being sent to the financial institutions. Other available options include a multi-step key exchange between the merchant (POS) and acquiring bank, and the acquiring bank and issuing bank, thus providing for secure data throughout the full extent of the financial transaction.

The location of the key exchange determines where during the transaction the confidential data can be accessed. By moving the location at which this takes place, data can be protected longer during the transaction process without being susceptible to theft. Adding the components necessary for this exchange may not always be feasible when dealing with multiple banks and vendors. Therefore, this operation is standardized and can be migrated depending on the needs of the system.

In accordance with certain aspects of an embodiment of the invention, a computer-implemented method of protecting electronic financial transaction data is provided, the method comprising: (1) providing a first network-based computing device including at least one processor and memory storing instructions, the at least one processor executing the instructions to perform the operations of: (a) performing a dynamic key exchange between the first network-based computing device operating in an encryption endpoint mode and a second network-based computing device operating in a decryption endpoint mode; (b) receiving at the first network-based computing device electronic transaction information associated with a financial transaction and including at least a personal account number in non-persistent memory; (c) executing a computer software-implemented data protection module at the first network-based computing device to (i) encrypt at least a portion of the electronic financial transaction data, (ii) remove the electronic financial transaction data from the non-persistent memory, (iii) apply cryptographic bitsplitting to break the encrypted electronic financial transaction data into a predetermined number of discrete data splits; (iv) store the predetermined number of discrete data splits across a plurality of distinct memory locations, and (v) generate metadata including routing and limited transaction information and excluding the encrypted portion of electronic financial transaction data; and (2) transferring the plurality of discrete data splits and the metadata to the second network-based computing device operating in a decryption endpoint mode.

In accordance with further aspects of an embodiment of the invention, a computer-implemented method of protecting electronic financial transaction data is provided, the method comprising: providing a first network-based computing device including at least one processor and memory storing instructions, the at least one processor executing the instructions to perform the operations of: (a) performing a dynamic key exchange between the first network-based computing device operating in an decryption endpoint mode and a second network-based computing device operating in an encryption endpoint mode; (b) receiving a plurality of discrete data splits and metadata from the second network-based computing device operating in an encryption endpoint mode, wherein the discrete data splits and metadata further comprise discrete portions of data corresponding to a single electronic financial transaction data set that has been processed by the second network-based computing device to (i) encrypt at least a portion of the electronic financial transaction data, (ii) apply cryptographic bitsplitting to break the encrypted electronic financial transaction data into the discrete data splits, and (iii) generate the metadata, wherein the metadata includes routing and limited transaction information and excludes the encrypted portion of electronic financial information; (c) executing a computer software-implemented data protection module at the first network-based computing device to decrypt the electronic financial transaction data; and (d) processing a financial transaction corresponding to the electronic financial transaction data set.

BRIEF DESCRIPTION OF THE DRAWINGS

The numerous advantages of the present invention may be better understood by those skilled in the art by reference to the accompanying drawings in which.

DETAILED DESCRIPTION

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The system and methods described herein provide data security that can be utilized by commerce vendors and financial institutions to increase security and grant a level of protection for confidential and possibly damaging information. The system and methods set forth herein protect the primary account numbers (PANs) and other sensitive data, while granting access to metadata necessary for information routing.

In a particularly preferred embodiment, the system is not built as a user application, but as a security component that is embedded with the current vendor and financial applications used within the financial transactions industry. As these protections are embedded in the financial applications, end user modifications are kept to a minimum. There are multiple factors that are involved with this system that are necessary for a strong security posture to be upheld, which will be detailed step by step in consecutive order, along with details of which systems/types of systems are involved.

Before any encryption or cryptographic operations can be conducted to protect the desired data sets, all endpoints must be "keyed". This "keying" is the process of performing a dynamic key exchange between endpoints, so that all endpoints have the necessary symmetric encryption key to perform encryption and decryption operations successfully. Prior to performing the key exchange, it is necessary to generate public/private key pairs for each endpoint. These key pairs serve as the bases for dynamic key exchange. A public/private key pair is an asymmetric key pair, and is used in asymmetric cryptography, specifically the necessary operations of a dynamic key exchange. This public/private key pair is generated for each endpoint.

Figure 1:
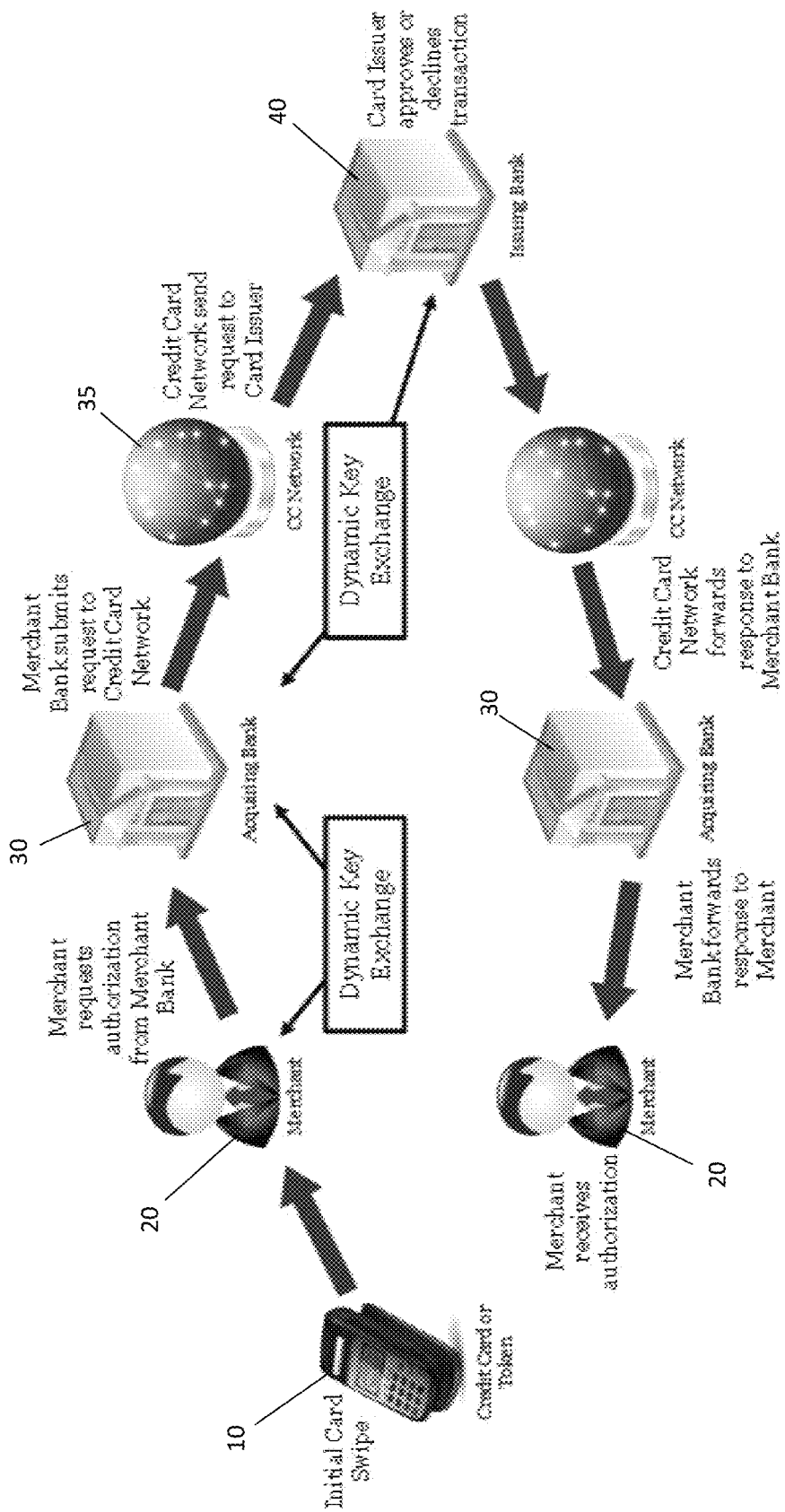
FIG. 1 is a schematic view of an exemplary environment for use with systems and methods configured in accordance with an embodiment of the invention.

FIG. 1 is a schematic view of an exemplary environment in which the systems and methods described herein may be deployed. As shown in FIG. 1, various computing devices may be provided and serve as encryption endpoints. Possible encryption endpoints may include a credit card reader 10, a POS system associated with a merchant 20, and a financial processing system of an acquiring bank 30. In this configuration, the credit card reader 10 may have a processor and an embedded operating system, the POS system may operate on a computing system having a commonly used operating system such as MICROSOFT WINDOWS, and the acquiring bank may employ a computing system of any form suitable for handling its electronic operations, all of which configurations are known to those of ordinary skill in the art and are thus not described further here. Similarly, possible decryption endpoints may include a mainframe server or other computing system associated with the merchant 20, the financial processing system of the acquiring bank 30, and the financial processing system of the issuing bank 40 (which again may comprise a computing system of any form suitable for handling its electronic operations in a configuration well known to those skilled in the art).

In this configuration, after financial data is captured by credit card reader 10 and/or elements of the merchant's POS system, information is captured by the POS system associated with the merchant 20. A dynamic key exchange, as discussed in greater detail below, may then be carried out between the processing system of the merchant 20 and the financial processing system of the acquiring bank 30, so as to allow secure data transfer between such processing systems 20 and 30 as the merchant requests authorization for the financial transaction from the acquiring bank (i.e., the merchant's bank). Likewise, a dynamic key exchange may be carried out between the processing system of the acquiring bank 30 and the financial processing system of the issuing bank 40, so as to allow secure data transfer between such processing systems 30 and 40 as the acquiring bank submits a request to the issuing bank through the credit card network 35. After receiving (and decrypting if encrypted) the financial transaction data, the issuing bank 40 may approve or decline the transaction, forward its response to acquiring bank 30, and acquiring bank 30 may forward its response to the computing system of the merchant 20 to either authorize or decline the transaction.

Figure 2:
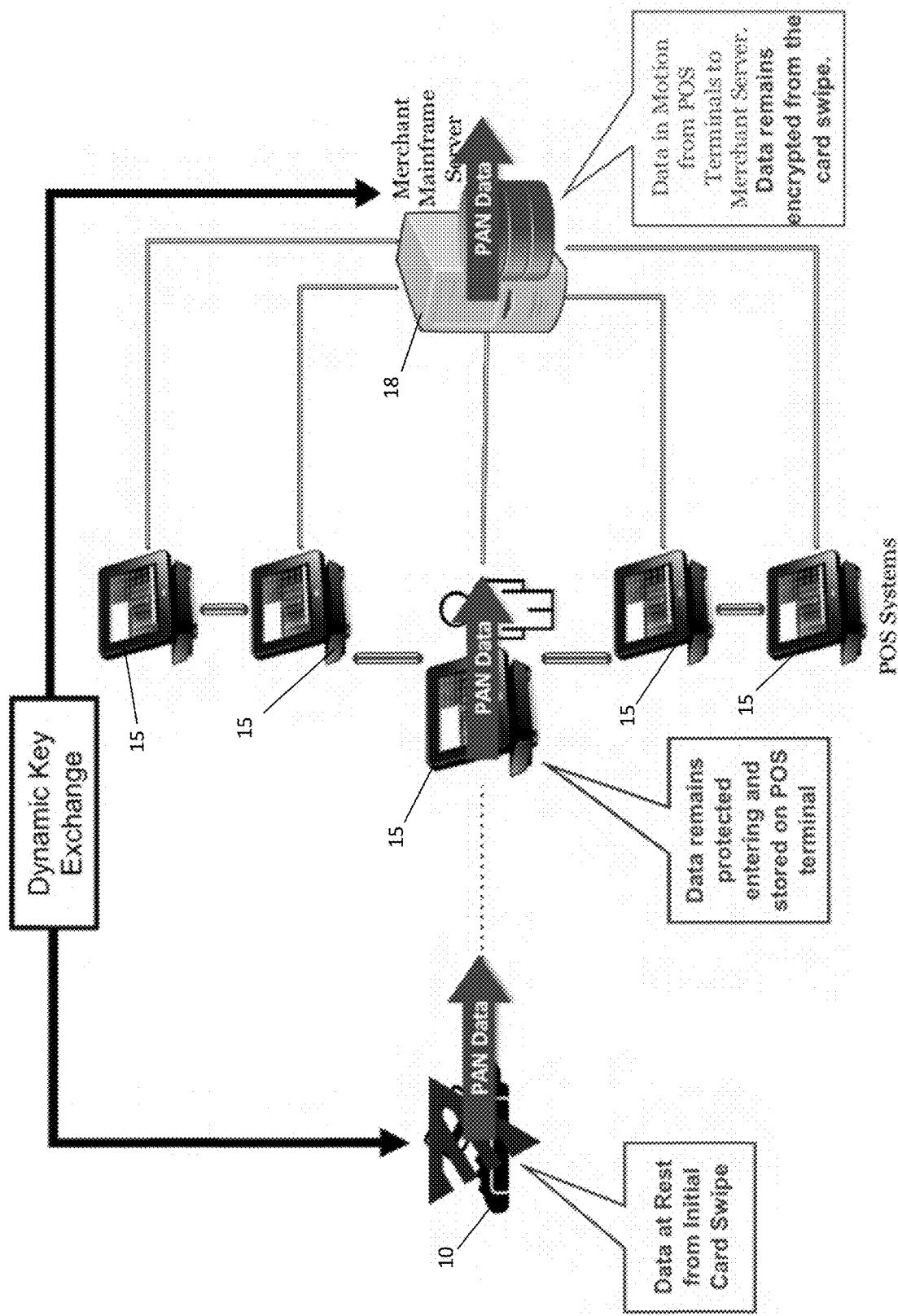
FIG. 2 is a schematic view of a dynamic key exchange on a merchant's computing system in accordance with certain aspects of an embodiment of the invention.

As mentioned briefly above, certain configurations may benefit from the system and methods set forth herein without requiring specialized configuration of the computing systems of the acquiring bank 30 and issuing bank 40. Rather, in those instances in which only simple vendor protection is necessary, key exchange can be conducted as shown in FIG. 2 between the endpoint device (scanner 10 and/or POS terminal 15) and the vendor centralized server 18, where the protection may be removed before being sent to the financial institutions. Other available options include the multi-step key exchange between the merchant (POS) and acquiring bank, and the acquiring bank and issuing bank, all as shown in FIG. 1, thus providing for secure data throughout the full extent of the financial transaction. As noted above, the location of the key exchange determines where during the transaction the confidential financial data can be accessed. Thus, by moving the location at which this takes place, data can be protected longer during the transaction process without being susceptible to theft.

In order to conduct such dynamic key exchange, the system and methods described herein follow established security guidelines for encryption, digital signatures, and key exchanges. These guidelines are outlined in the Suite B Cryptography program established by the National Security Agency (NSA). Suite B details which cryptographic algorithms should be used when conducting specific functions. The system and methods described herein adhere to these algorithms. Those are detailed at https://www.nsa.gov/ia/programs/suiteb_cryptography/, (presently available at https://web.archive.org/web/20160127123224/https//www.nsa.gov/ia/program/suitb_crptography/), the specifications of which are incorporated herein by reference in their entireties.

When using asymmetric cryptography, it is established that public keys are transferred between endpoints and used in the encryption process when encrypting a symmetric key needed for block ciphers. Because public keys are transferred, it is necessary to verify and perform assurance that the public keys transferred are actually from an authorized endpoint, and not from a malicious user.

To grant the level of assurance, the public key for these endpoints is stored within a certificate authority with network access to the endpoints. The purpose of this certificate authority (CA) is to validate the public keys of each endpoint in the system, so that a malicious system cannot be inserted to perform man-in-the-middle (MITM) attacks against the communication channels between endpoints.

This CA serves as a trusted third party (TTP) and is used to provide assurance of parameters. This assurance includes at least two different steps. The first is the assurance that the public key is from an authorized source. This involves the use of public key certificates that have been signed by the CA. This is typical in enterprise architectures.

The system uses an established public key infrastructure (PKI) to handle these certificates.

Once a trusted public key certificate is established, there is a level of trust between two endpoints and a key exchange can be performed. In a particularly preferred embodiment, this dynamic key exchange is implemented using a Suite B approved algorithm, specifically Elliptic Curve Diffie-Hellman (ECDH), referenced above and presently available at https://csrc.nist.gov/publications/detail/sp/800-56a/rev-3/final). ECDH uses a separate public/private key pair from digital signatures, and are generated using Elliptic Curve Cryptography (ECC) instead of RSA. To perform the key exchange, two endpoints use the CA to exchange trusted public keys, with the CA performing the required arithmetic assurance of the public key.

Once public keys are exchanged, the ECDH algorithm uses discrete logarithm operations to generate a shared symmetric key that is used in block cipher encryption algorithms at the encryption endpoint. Once this key is established, it is used for a limited interval before again being reestablished. This limited use provides an additional layer of security within the block ciphers. If the symmetric key is compromised, only data during the current interval is compromised, and once a key is reestablished the compromised key is useless.

Figure 3:
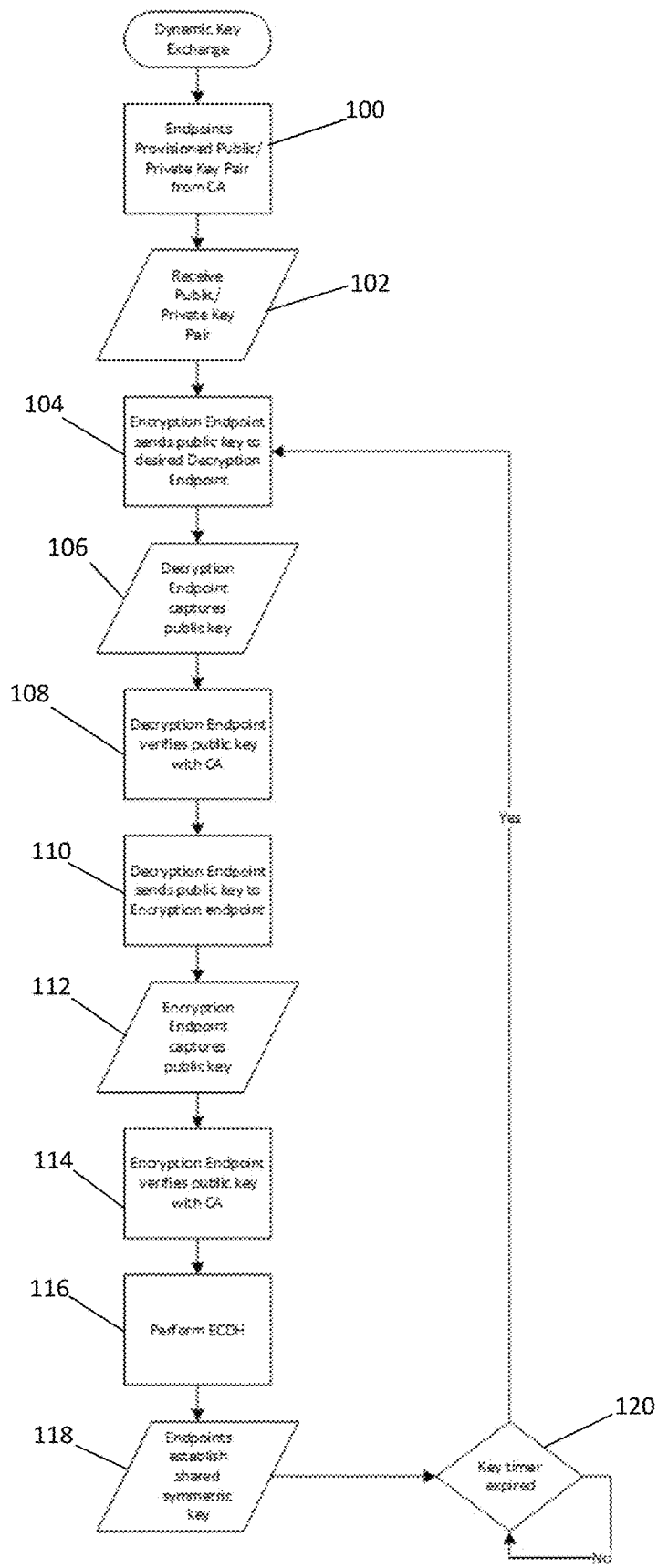
FIG. 3 provides a schematic view of the steps carried out between system endpoints to perform a key exchange in accordance with certain aspects of an embodiment of the invention.

FIG. 3 provides a schematic view of the steps carried out between system endpoints to perform a key exchange in accordance with certain aspects of an embodiment of the invention. At step 100, financial transaction system endpoints are provisioned with public/private key pairs from a certificate authority, and at step 102, they receive those public/private key pairs. At step 104, the encryption endpoint sends its public key to the desired decryption endpoint with which it will share electronic transaction information. At step 106, the decryption endpoint captures the public key sent from the encryption endpoint, and at step 108, the decryption endpoint verifies that public key with the certificate authority. At step 110, the decryption endpoint then sends its public key to the encryption endpoint, at step 112 the encryption endpoint captures that public key, and at step 114 the encryption endpoint verifies that public key with the certificate authority. As mentioned above, after the exchange of public keys, at step 116 ECDH is performed at the encryption endpoint, and at step 118 the endpoints establish the shared symmetric key. A timer registers the time for which such shared symmetric key remains active, and at step 120, a determination is made whether the time that such shared symmetric key has been active has exceeded a predetermined threshold. In the event that such time period has expired, the method returns to step 104 to again being the dynamic key exchange process.

The dynamic key exchange process takes place over computer network communication, preferably through the use of (by way of non-limiting example) the TCP/IP protocol. The shared secret key established during the dynamic key exchange is stored within a secure container on each endpoint, restricting access only to the financial application, and with it the protection module.

Once a key exchange has taken place, each endpoint has a shared symmetric key that can be used for block cipher encryption/decryption. This encryption takes place when the transaction information is first placed into non-persistent memory on the POS systems (or card reader if possible). The saving of this protected data is a multi-step process. The first is the integration with the financial applications that read credit card data from the hardware card reader or swiper. When this data is read in, it is immediately processed by the protection module.

This protection module performs the following steps: (1) encrypt the necessary data sets with an AES-256 block cipher as specified in FIPS-197 under the Suite B program (http://csrc.nist.gov/publications/fips/fips197/fips-197.pdf); (2) remove any trace of the original, unencrypted data that may be left in non-persistent memory; (3) perform a specialized encryption algorithm that breaks up the data into a desired amount of splits (n number), preferably adding additional layers of security and obfuscation around the transaction data; and (4) store the n number of splits across n number of memory locations, managed by the protection module.

The specialized encryption algorithm is a key information dispersal algorithm (IDA). This algorithm takes a set of data, and pseudo-randomly splits the file into a desired number of n pieces. This splitting of data acts much like a second level of encryption, and uses a generated key much in the same manner. The reconstitution of these pieces can only be achieved if a pre-specified number of the original shreds are available. This achieves a cryptographic fault tolerance, allowing data to be reconstructed without all of the original shreds, if that is the desired configuration. Typically, this is described as an M:N configuration, where N is the total number of shreds, and M is the minimum number necessary to recombine the file.

As mentioned previously, metadata is joined with the encrypted data components after encryption and the IDA have taken place. This metadata contains the necessary routing and transaction information required by the financial software without compromising the account information such as credit card numbers and account numbers. The metadata will contain information that preferably includes at least issuing bank, transaction total, merchant, the last four digits of the subject account number, and a hash-based message authentication code (HMAC). HMACs are used to authenticate that the data inside the message is correct. In this case, the HMAC will be used to guarantee that the metadata and encrypted data has not been tampered with during its lifespan. The logic behind this deals with chosen cipher text attacks, where malicious users can modify encrypted data, and gain knowledge through the decryption process. Through the implementation of an HMAC, these attacks can be prevented, and corrupted transaction data can be caught and corrected.

Figure 4:
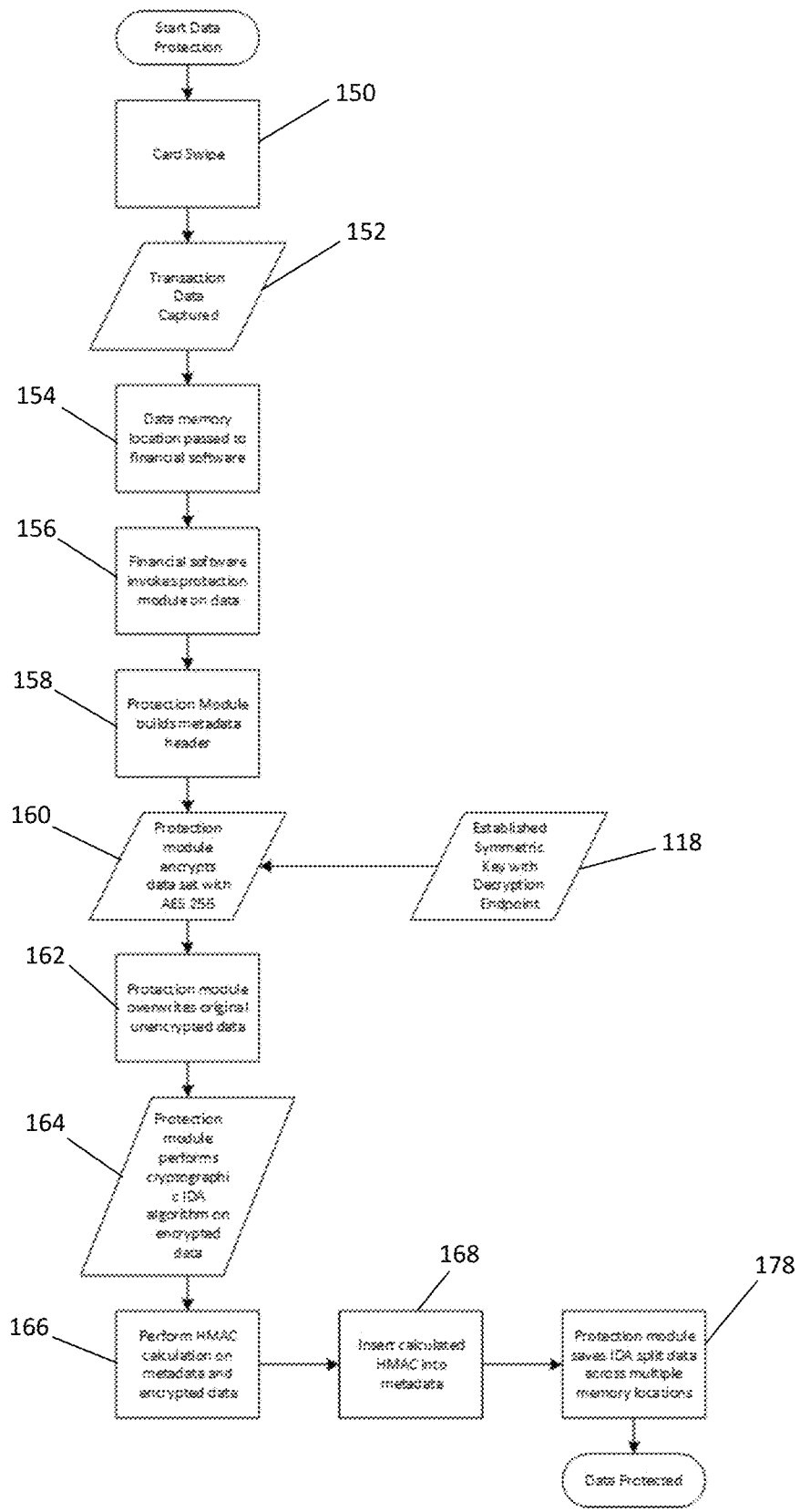
FIG. 4 provides a schematic view of the steps carried out by an encryption endpoint in accordance with certain aspects of an embodiment of the invention.

FIG. 4 provides a schematic view of the steps carried out by an encryption endpoint in accordance with certain aspects of an embodiment of the invention. At step 150, a consumer's credit or debit card or other payment device is swiped or otherwise read by a card reader. At step 152, electronic financial transaction data is captured, and at step 154, the memory location of such electronic financial transaction data is passed to the financial software that is to process such data. At step 156, the financial software then executes the functions of the protection module on such data. At step 158, the protection module builds the metadata header as discussed above, and at step 160, the protection module encrypts the data set with AES 256. Such encryption is carried out with the symmetric key shared with and provided by the decryption endpoint at step 118. The protection module overwrites the original unencrypted data at step 162, and at step 164 performs a cryptographic IDA algorithm on the encrypted data. Then, at step 166, an HMAC calculation is performed on the metadata and the encrypted data, and at step 168, the calculated HMAC is inserted into the metadata. At step 170, the protection module then saves the IDA split data across multiple memory locations.

As the data is transferred between non-endpoint components, it is packaged in a similar manner to that described above, although with PAN and privileged information protected. When transferring data, the financial applications will again access the data through the protection module that is integrated into the applications. This will format the data for routing through the transaction process until it reaches a decryption endpoint.

When a decryption endpoint is reached, the protection module must decrypt the data to plain text using the symmetric key established during a key exchange. The protection module thus performs the following decryption steps: (1) consolidate the n number of splits back into a single encrypted data buffer using cryptographic bitsplitting; (2) decrypt the necessary data using AES-256 block cipher as specified in FIPS-197 under the Suite B program (http://csrc.nist.gov/publications/fips/fips197/fips-197.pdf); and (3) store the unencrypted data sets in memory for processing at trusted endpoint.

Figure 5:
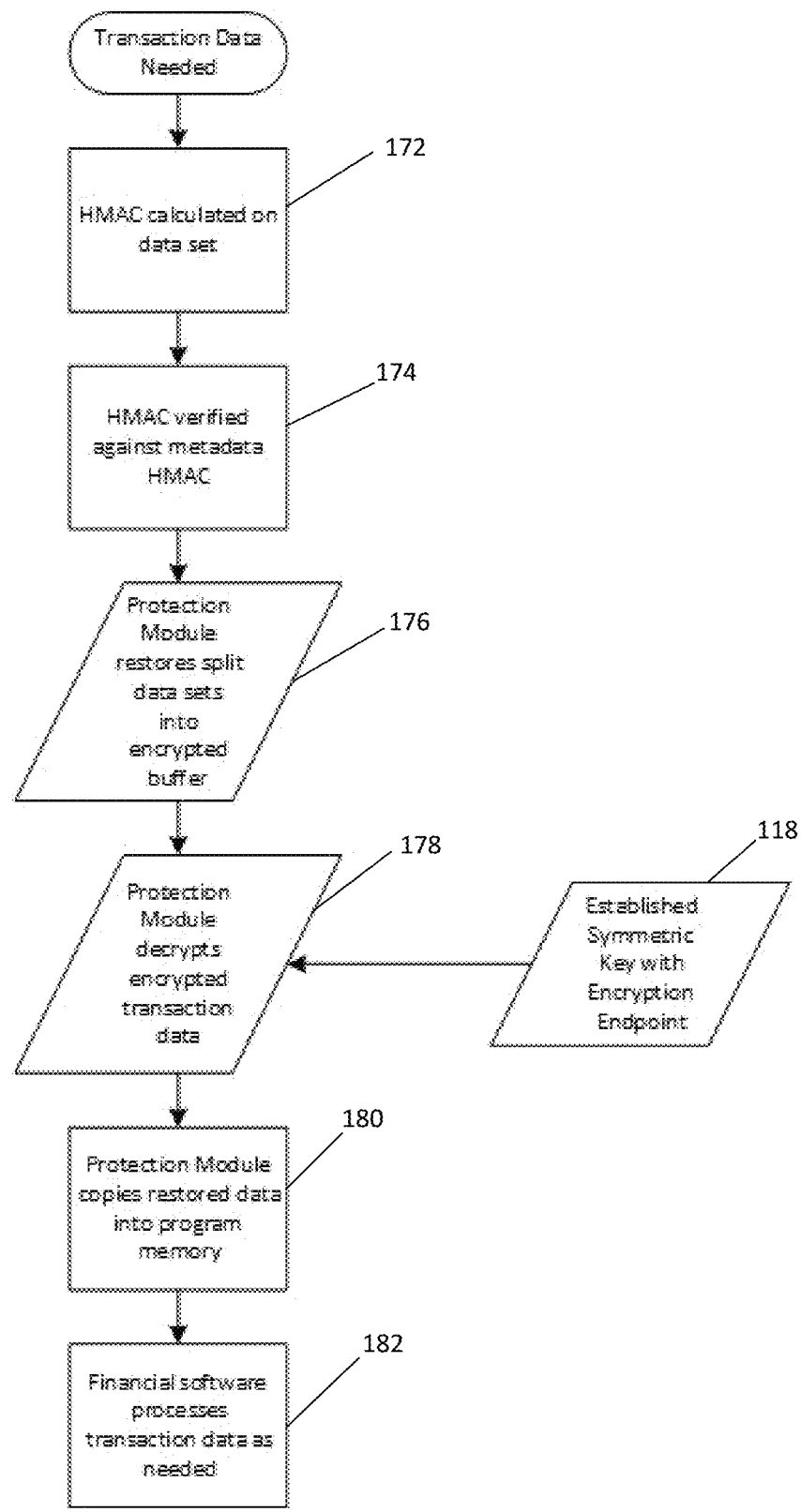
FIG. 5 provides a schematic view of the steps carried out by a decryption endpoint in accordance with certain aspects of an embodiment of the invention.

FIG. 5 provides a schematic view of the steps carried out by a decryption endpoint in accordance with certain aspects of an embodiment of the invention. At step 172, the HMAC is calculated on the data set, and at step 174 the HMAC is verified against the metadata HMAC. At step 176, the protection module restores the split data sets into an encrypted buffer, and at step 178 the protection module decrypts the encrypted transaction data, using the established symmetric key provided by the encryption endpoint at step 118. Next, the protection module at step 180 copies the restored data into program memory, and at step 182 the financial software processes the transaction data as appropriate for the particular transaction.

Figure 6:
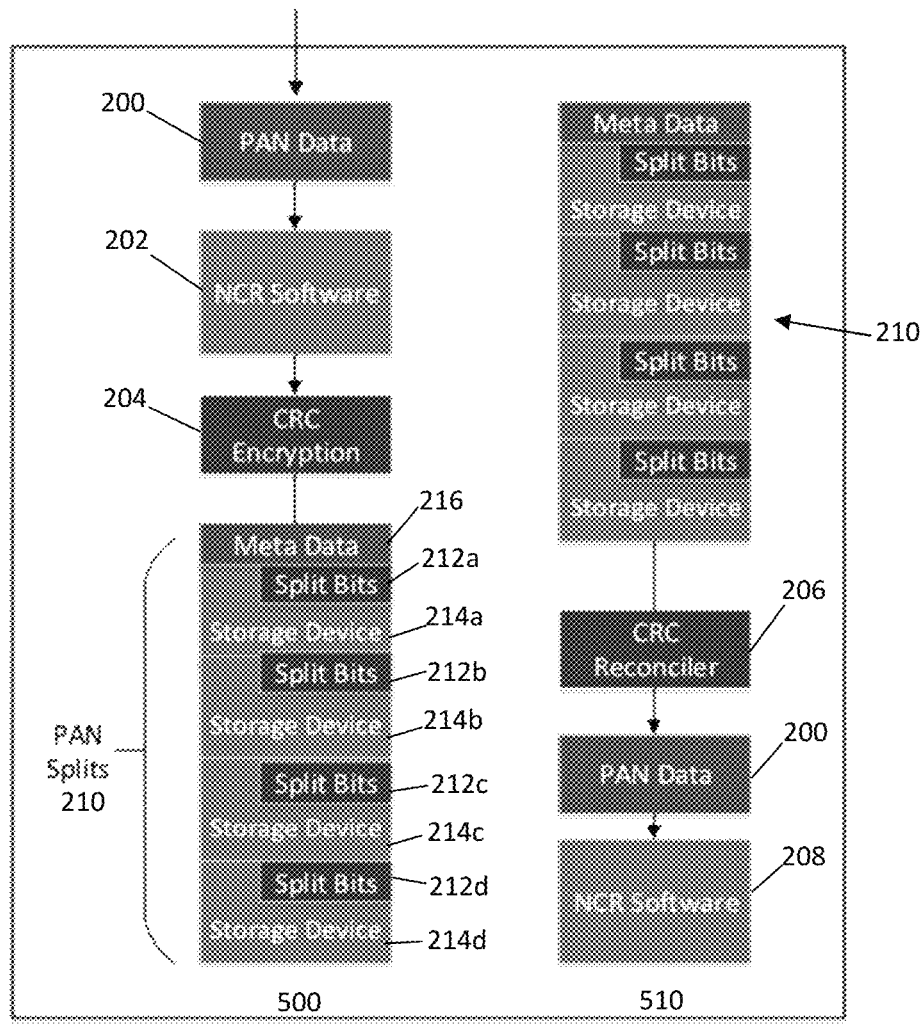
FIG. 6 shows a schematic view of the flow of transaction data as it is processed by the protection module in accordance with certain aspects of an embodiment of the invention.

FIG. 6 shows a schematic view of the overall flow of transaction data as it is processed by the protection module. As shown in FIG. 6, during an encryption process 500, primary account number ("PAN") data 200 is captured from the user's credit or debit card or other payment device, and is passed to the POS software 202. Thereafter, the encryption processes 204 described above are carried out, and the data 210 (particularly including the PAN) are stored as split bits 212a, 212b, 212c and 212d in separate memory storage devices 214a, 214b, 214c, and 214d with associated meta data 216 as described above. Likewise, during the decryption process 510, the stored data 210 are passed through the decryption processes 206 described above so as to decrypt the PAN data 200 for further processing by the financial software 208 at the decryption endpoint.

The foregoing methods are implemented on computing hardware of traditional configuration used in the processing of electronic financial transactions, optimally including (as shown in FIG. 1) computing hardware implementing a credit card reader, a merchant POS system, a merchant's mainframe server or other element executing financial and related software, and computing systems of financial institutions, including those of acquiring banks and credit card issuers, each of which may be configured as appropriate to support their individual functions and in manners well known to those skilled in the art. In each implementation, a system should include at least a certificate authority, an encryption protection module, and a decryption protection module. By way of summary, the certificate authority provides the public key infrastructure and public key validation in accordance with NIST Special Publication 800-56A. Likewise, each of the encryption protection module and the decryption protection module provide ECDH implementation for dynamic key exchange, a cryptographic engine for either AES encryption or decryption and implantation of a specialized IDA, and memory management/access API.

Moreover, the specific computing hardware may be configured as appropriate by those of ordinary skill in the art to meet a particular installation's requirements. Such computing hardware may include by way of non-limiting example, storage I/O may be accomplished over a TCP/IP network in virtual environments, and includes the fiber, Ethernet, SCSII, NAS, or even SATA connection from the physical host to the physical storage device. This is used by the system to send and receive file content and metadata. Likewise, network connectivity to storage is provided in the form of a physical connection from the storage devices to the network infrastructure. This is typically a TCP/IP, Fiber, or direct Ethernet connection. Various data storage devices may be provided, including physical storage devices and cloud storage devices configured in such manner as may be deemed appropriate by a person skilled in the art.

Those skilled in the art will recognize that the above systems and methods may be modified or supplemented to best suit a particular installation's requirements. For instance (and by way of non-limiting example), additional security may be provided by combining one or more functions of file encryption, parsing the data files described herein into parts, parsing the key store into parts, parsing file pointers into parts, applying software RAID, and storing written data to varied storage locations, all as described in copending and co-owned U.S. Pat. No. 10,452,857 titled "Systems and Methods for Providing File Level Security," the specification of which is incorporated herein by reference in its entirety.

The various embodiments have been described herein in an illustrative manner, and it is to be understood that the terminology used is intended to be in the nature of words of description rather than of limitation. Any embodiment herein disclosed may include one or more aspects of the other embodiments. The exemplary embodiments were described to explain some of the principles of the present invention so that others skilled in the art may practice the invention. Obviously, many modifications and variations of the invention are possible in light of the above teachings. The present invention may be practiced otherwise than as specifically described within the scope of the appended claims and their legal equivalents.

What is claimed is:

1. A computer-implemented method of protecting electronic financial transaction data, the method comprising the steps of:
 (i) providing a first network-based computing device including at least one processor and memory storing instructions, said first network-based computing device further comprising one of a credit card reader or a POS system associated with a merchant;
 (ii) initiating at said first network-based computing device a dynamic key exchange using an Elliptic Curve Diffie-Hellman (ECDH) algorithm between said first network-based computing device operating in an encryption endpoint mode and a second network-based computing device operating in a decryption endpoint mode, wherein the dynamic key exchange comprises:
  (a) generating public/private key pairs for said first network-based computing device and said second network-based computing device;
  (b) exchanging public keys between said first network-based computing device and said second network-based computing device through a certificate authority that validates the public keys of each endpoint; and
  (c) generating a shared symmetric key configured for use in block cipher encryption at said first network-based computing device, wherein the shared symmetric key is used for a limited interval before being reestablished;
 (iii) receiving at said first network-based computing device electronic transaction information associated with a financial transaction and including at least a personal account number in non-persistent memory;
 (iv) causing said first network-based computing device to:
  (a) encrypt at least a portion of said electronic financial transaction data using an AES-256 block cipher,
  (b) remove said encrypted portion of said electronic financial transaction data from said non-persistent memory and remove any trace of the original, unencrypted data that may be left in non-persistent memory,
  (c) apply cryptographic bitsplitting comprising a key information dispersal algorithm to break said encrypted portion of said electronic financial transaction data into a predetermined number of discrete data splits, wherein the key information dispersal algorithm pseud-randomly splits the data into a desired number of n pieces, and wherein reconstitution of these pieces can only be achieved if a pre-specified number of the original shreds are available;
  (d) store said predetermined number of discrete data splits across a plurality of distinct memory locations, and
  (e) generate metadata including routing and transaction information, an identification of an issuing bank, a transaction total, an identification of a merchant, a listing of the last four digits of a purchaser's account number, and a hash-based message authentication code (HMAC), and excluding said encrypted portion of electronic financial transaction data;
 (v) transferring said plurality of discrete data splits and said metadata to said second network-based computing device operating in said decryption endpoint mode;
 (vi) processing at said second network-based computing device said dynamic key exchange between said second network-based computing device operating in said decryption endpoint mode and said first network-based computing device operating in said encryption endpoint mode;
 (vii) receiving at said second network-based computing device said plurality of discrete data splits and metadata from said first network-based computing device operating in said encryption endpoint mode, wherein said discrete data splits and metadata further comprise discrete portions of data corresponding to a single electronic financial transaction data set that has been processed at step (iv) by said first network-based computing device;
 (viii) causing said second network-based computing device to decrypt said electronic financial transaction data by
  (a) verifying the HMAC to ensure that the metadata and encrypted data have not been tampered with during its lifespan, (b) consolidating the n number of splits back into a single encrypted data buffer using cryptographic bitsplitting, and (c) decrypting the necessary data using the AES-256 block cipher; and (ix) processing at said second network-based computing device a financial transaction corresponding to said electronic financial transaction data set.

2. The method of claim 1, wherein the steps of initiating and processing a dynamic key exchange further comprises:

generating public/private key pairs for said first network-based computing device operating in said encryption endpoint mode and said second network-based computing device operating in said decryption endpoint mode;

exchanging public keys between said first network-based computing device and said second network-based computing device through the certificate authority; and generating the shared symmetric key configured for use in block cypher encryption at said first network-based computing device.

3. The method of claim 2, wherein said shared symmetric key expires after a predetermined amount of time.

4. The method of claim 2, further comprising the step of storing said shared symmetric key within a secure data container at each of said first network-based computing device and said second network-based computing device.

5. The method of claim 1, wherein the step of causing said first network-based computing device to encrypt at least a portion of said electronic financial transaction data further comprises encrypting said portion of said electronic financial transaction data using an AES-256 block cipher.

6. The method of claim 1, wherein said metadata further comprises one or more of an identification of an issuing bank, a transaction total, an identification of a merchant, a listing of the last four digits of a purchaser's account number, and a hash-based message authentication code.

7. The method of claim 1, wherein said step of transferring said plurality of discrete data splits and said metadata to said second network-based computing device operating in said decryption endpoint mode further comprises transferring said plurality of discrete data splits and said metadata through one or more intermediate data transfer points.

8. The method of claim 1, wherein the step of causing said second network-based computing device to decrypt said electronic financial transaction data further comprises consolidating said discrete data splits into a single encrypted data buffer using the cryptographic bitsplitting algorithm.

9. The method of claim 8, wherein the step of causing said second network-based computing device to decrypt said electronic financial transaction data further comprises decrypting at least a portion of said single encrypted data file.

10. The method of claim 9, wherein decrypting at least a portion of said single encrypted data file further comprises using an AES-256 block cipher.

11. The method of claim 9, further comprising the step of storing said decrypted data sets in memory for processing by said second network-based computing device.

12. A computer-implemented method for securing electronic financial transaction data, comprising:

(a) initiating, at a first network-based computing device, a dynamic key exchange using an Elliptic Curve Diffie-Hellman (ECDH) algorithm with a second network-based computing device, wherein the dynamic key exchange comprises:

(i) generating public/private key pairs for the first and second network-based computing devices;

(ii) exchanging public keys between the first and second network-based computing devices through a certificate authority that validates the public keys; and (iii) generating a shared symmetric key for use in block cipher encryption, wherein the shared symmetric key is valid for a limited time interval;

(b) receiving, at the first network-based computing device, electronic financial transaction data including a personal account number;

(c) encrypting, at the first network-based computing device, at least a portion of the electronic financial transaction data using an AES-256 block cipher;

(d) removing the encrypted portion of the electronic financial transaction data from non-persistent memory and overwriting any trace of the original, unencrypted data in the non-persistent memory; and (e) applying a cryptographic bitsplitting algorithm to the encrypted portion of the electronic financial transaction data to create a predetermined number of discrete data splits, wherein:

(i) the cryptographic bitsplitting algorithm pseudo-randomly splits the encrypted data into n pieces; and (ii) reconstitution of the encrypted data requires a pre-specified number of the original n pieces;

(f) storing the discrete data splits across a plurality of distinct memory locations;

(g) generating metadata including routing and transaction information, an issuing bank identifier, a transaction total, a merchant identifier, the last four digits of the personal account number, and a hash-based message authentication code (HMAC), wherein the metadata excludes the encrypted portion of the electronic financial transaction data;

(h) transferring the discrete data splits and the metadata to the second network-based computing device;

(i) at the second network-based computing device:

(i) verifying the HMAC to ensure data integrity;

(ii) consolidating the discrete data splits into a single encrypted data buffer using the cryptographic bitsplitting algorithm; and (iii) decrypting the consolidated data using the AES-256 block cipher and the shared symmetric key; and (j) processing, at the second network-based computing device, a financial transaction corresponding to the decrypted electronic financial transaction data.

\* \* \* \* \*